(12) United States Patent
De Los Reyes et al.

(10) Patent No.: US 8,499,304 B2
(45) Date of Patent: Jul. 30, 2013

(54) MULTIPLE MODE MOBILE DEVICE

(75) Inventors: Gustavo De Los Reyes, Fair Haven, NJ (US); Michael Horton, Bothell, WA (US); Sanjay Macwan, Marlboro, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 823 days.

(21) Appl. No.: 12/638,957

(22) Filed: Dec. 15, 2009

(65) Prior Publication Data

US 2011/0145833 A1 Jun. 16, 2011

(51) Int. Cl.
*G06F 9/46* (2006.01)
(52) U.S. Cl.
USPC ............... 718/106; 726/17; 726/18; 726/19; 726/20; 726/21; 726/26; 726/27; 726/28; 726/29; 726/30
(58) Field of Classification Search
USPC ............................ 718/106; 726/17–21, 26–30
See application file for complete search history.

(56) References Cited

U.S. PATENT DOCUMENTS

| | | | | |
|---|---|---|---|---|
| 6,092,147 | A * | 7/2000 | Levy et al. ...................... | 711/6 |
| 7,020,772 | B2 * | 3/2006 | England et al. ................ | 713/166 |
| 7,073,059 | B2 * | 7/2006 | Worely et al. .................. | 713/168 |
| 7,143,412 | B2 * | 11/2006 | Koenen ........................... | 718/102 |
| 7,162,617 | B2 * | 1/2007 | Ota et al. ........................ | 712/229 |
| 7,581,253 | B2 * | 8/2009 | Challener et al. ............... | 726/24 |
| 7,810,092 | B1 * | 10/2010 | van Rietschote et al. ......... | 718/1 |
| 8,028,290 | B2 * | 9/2011 | Rymarczyk et al. ........... | 718/104 |
| 8,209,408 | B1 * | 6/2012 | Huang et al. ................... | 709/223 |
| 2010/0037243 | A1 * | 2/2010 | Mo et al. ........................ | 719/328 |

OTHER PUBLICATIONS

Geer, David, The OS Faces a Brave New World, Technology News—IEEE, Oct. 2009, pp. 15-17, IEEE Computer Society.

\* cited by examiner

*Primary Examiner* — Mamon Obeid
(74) *Attorney, Agent, or Firm* — Toler Law Group, PC

(57) ABSTRACT

In one or more embodiments, one or more methods and/or systems described can perform displaying, on a handheld device, multiple icons associated with multiple segments; receiving first user input indicating a first segment of the multiple segments; executing a first virtual machine associated with the first segment on the handheld device; executing a first application on the first virtual machine; receiving second user input indicating a second segment of the multiple segments; executing a second virtual machine associated with the second segment on the handheld device; and executing a second application on the second virtual machine. In one or more embodiments, one or more methods and/or systems described can further perform before executing the second virtual machine, receiving authentication information and determining that the user is authenticated. In one or more embodiments, the authentication information can include at least one of a user name, a password, and/or biometric information.

14 Claims, 10 Drawing Sheets

MULTIPLE MODE MOBILE DEVICE

BACKGROUND

1. Technical Field

This disclosure relates generally to the field of separating applications of a mobile device and, more specifically, this disclosure pertains to the field of executing separating applications of a mobile device such that an execution of one application is isolated from another application.

2. Description of the Related Art

In the past, users of mobile devices (e.g., mobile telephones, laptops, etc.) typically had separate devices for their personal computing activities and their business computing activities. By a user using separate devices, a business could protect its business devices, for example, against malicious applications. However, users today are more frequently using a single device for both their personal and business computing activities. This leads to conflicts that can affect the security of the business' operation or data stored on the single device. For example, a user may download an interesting consumer or personal application that may crash the single device, or worse, download malicious software (e.g., a Trojan horse, a virus, a worm, etc.) that compromises the business' data, since personal and business computing activities are not isolated.

BRIEF DESCRIPTION OF THE DRAWINGS

The preferred embodiments will become apparent upon reading the following detailed description and upon reference to the accompanying drawings in which.

Figure 1:
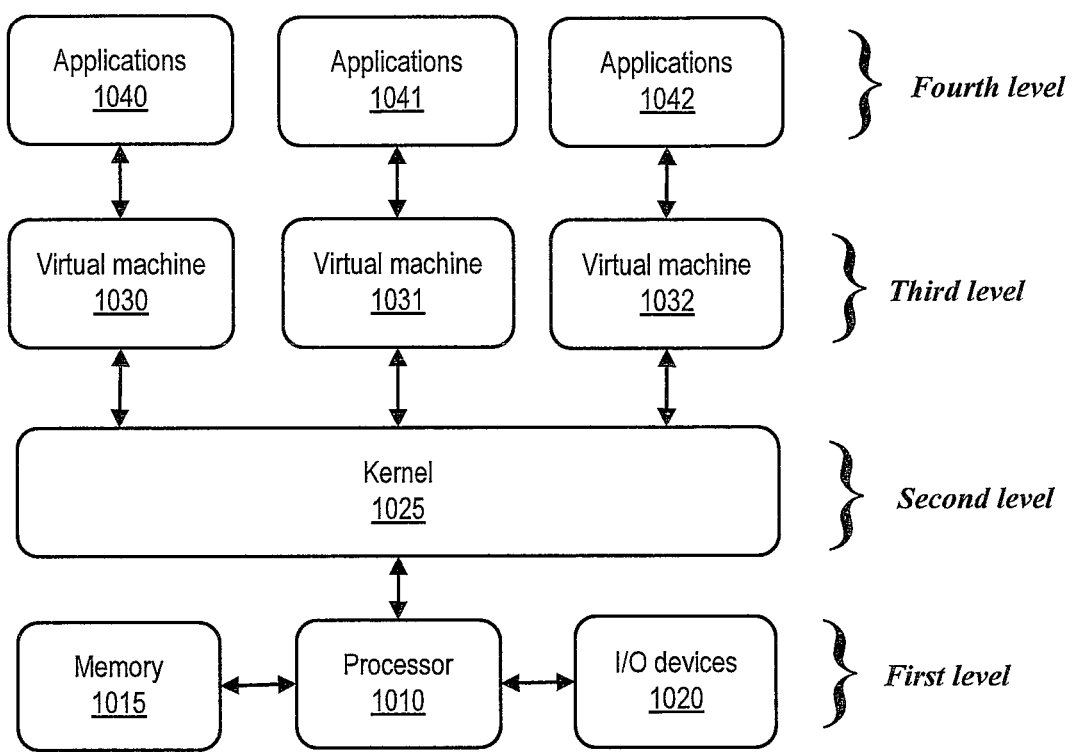
FIG. 1 provides a block diagram of conceptual levels of a computing system and software, according to one or more embodiments.

While the invention is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of an invention as defined by appended claims.

DETAILED DESCRIPTION

FIG. 1 illustrates a block diagram of conceptual levels of a computing system and software, according to one or more embodiments. As illustrated, a first level can include a hardware level that can include a processor 1010, a memory 1015, and I/O devices 1020. A second level can include a kernel 1025. In one or more embodiments, kernel 1025 can include instructions executable by processor 1010 to interact with and/or provide an application programming interface (API) for access of I/O devices 1020 and/or memory 1015.

As shown, a third level can include virtual machines 1030-1032. In one or more embodiments, a virtual machine can include instructions executable by processor 1010 to allow virtualization of resources of the second and first levels. As illustrated, a fourth level can include applications 1040-1042. In one or more embodiments, applications 1040-1042 can be executed on respective virtual machines 1030-1032. In one or more embodiments, applications executing on a first virtual machine are isolated from applications executing on a second virtual machine. For example, applications 1040 executing on virtual machine 1030 are isolated from applications executing on virtual machine 1031. For instance, one or more of applications 1040 may crash virtual machine 1030, and since applications 1041 executing on virtual machine 1031 are isolated from applications 1040 and virtual machine 1030, applications 1041 executing on virtual machine 1031 are not hindered by one or more of applications 1040 crashing virtual machine 1030.

Figure 2:
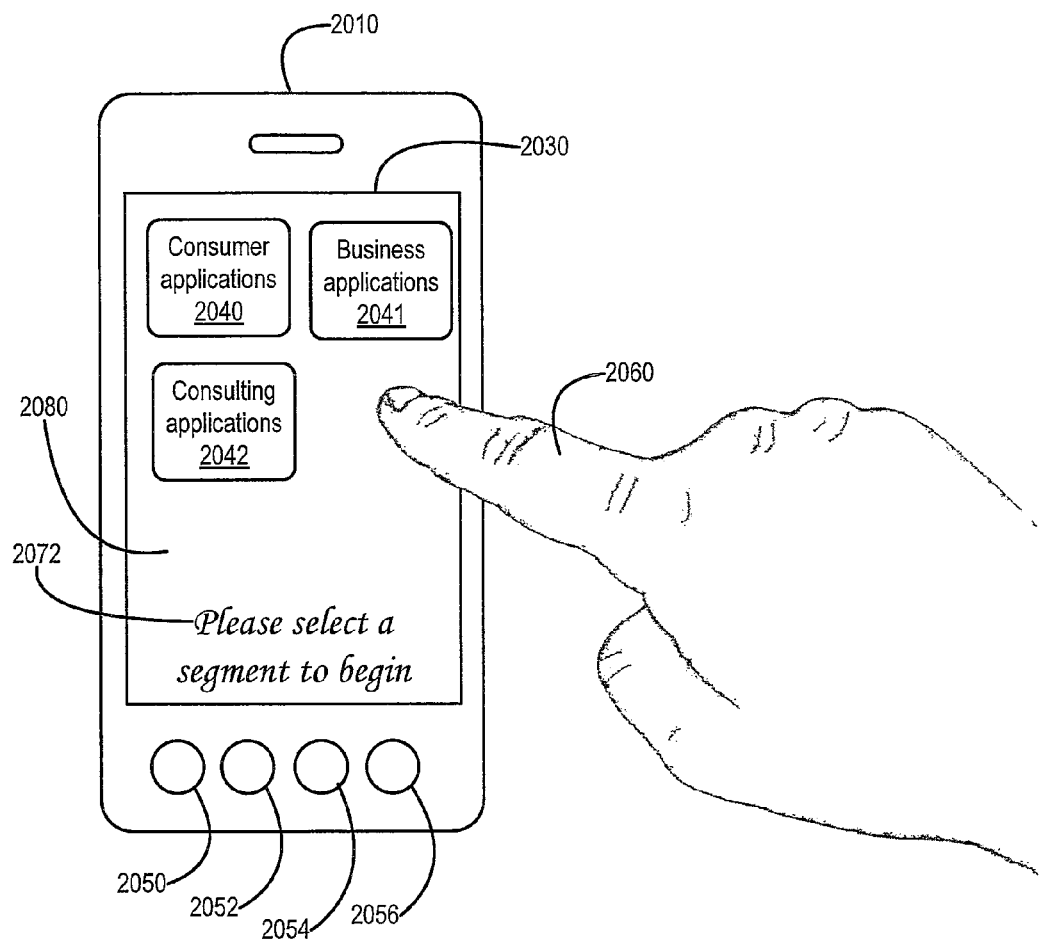
FIG. 2 provides a diagram of a mobile device, according to one or more embodiments.

Turning now to FIG. 2, a diagram of a mobile device, application groupings, and a portion of a user of the mobile device are illustrated, according to one or more embodiments. As shown, a mobile device (MD) 2010 can include one or more user selectable buttons 2050-2056, and MD 2010 can include a touch screen 2030. As illustrated, icons 2040-2042 can be displayed on a screen 2070 by touch screen 2030. In one or more embodiments, a screen displayed by touch screen 2030 can graphically present images and/or text. For example, a screen displayed by touch screen 2030 can graphically present images and/or text associated with a mode of operation of MD 2010. For instance, screen 2070 can present icons 2040-2042 and message 2072 for a segment selection mode of MD 2010. In one or more embodiments, one or more of icons 2040-2042 can be selected by a digit (e.g., a finger) 2060 or other appendage of a user of MD 2010 and/or one or more of icons 2040-2042 can be selected by a stylus (not shown). In one more embodiments, icons 2040-2042 can represent segments or groupings of applications. For example, icons 2040-2042 can represent groupings of applications 1040-1042, respectively. In one or more embodiments, applications and a corresponding virtual machine can be referred to as a segment. For example, applications 1040 and virtual machine 1030 can be referred to as a segment, and icon 2040 can be associated with a segment that includes applications 1040 and virtual machine 1030. Similarly, icon 2041 can be associated with a segment that includes applications 1041 and virtual machine 1031, and icon 2042 can be associated with a segment that includes applications 1042 and virtual machine 1032.

Figure 3:
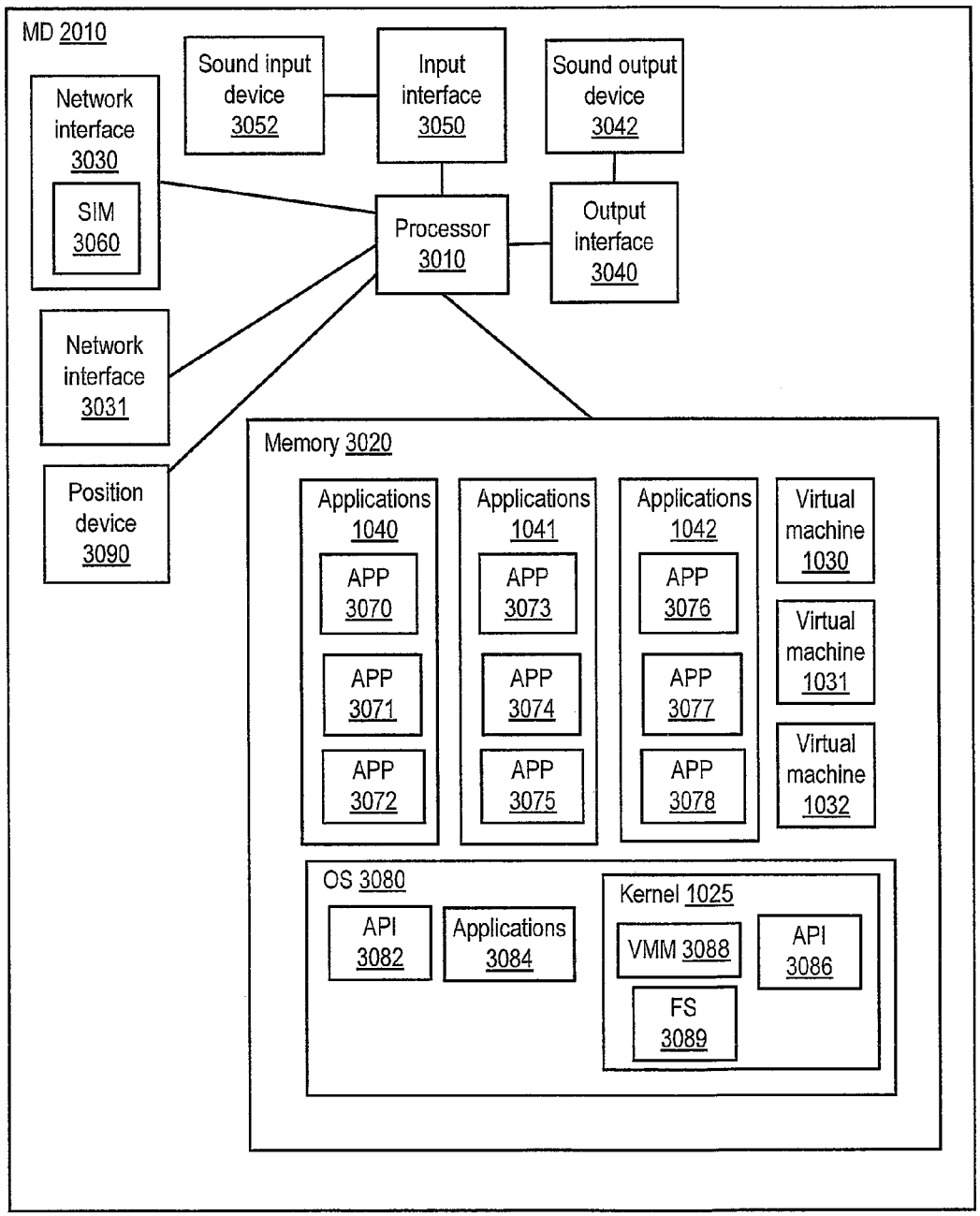
FIG. 3 provides a block diagram of a mobile device, according to one or more embodiments.

Turning now to FIG. 3, a block diagram of a mobile device is illustrated, according to one or more embodiments. As shown, MD 2010 can include a memory 3020 coupled to a processor 3010, and MD 2010 can include network interfaces 3030 and 3031, user output interface 3040, user input interface 3050, and a position device 3090 coupled to processor 3010. In one or more embodiments, I/O devices 1020 can be or include network interfaces 3030 and 3031, user output interface 3040, user input interface 3050, and a position device 3090, among others. In one or more embodiments, MD 2010 may be any of various types of devices, including a computer system, such as a portable computer, a personal digital assistant (PDA), a mobile telephone (e.g., a cellular telephone, a satellite telephone, etc.), a wearable computing device, an Internet appliance, a communications device, a handheld mobile computing device, or other wired or wireless device.

In one or more embodiments, processor 3010 can be or include processor 1010. In one or more embodiments, processor 3010 can include one or more cores, and each core of processor 3010 can implement an instruction set architecture (ISA). In one or more embodiments, each of multiple cores of processor 3010 can execute different instructions from the ISA simultaneously.

In one or more embodiments, memory 3020 can be or include memory 1015. In one or more embodiments, memory 3020 can include applications 1040-1042, virtual machines 1030-1032, and an operating system (OS) 3080. As shown, applications 1040-1042 can respectively include applications (APPs) 3070-3072, APPs 3073-3075, and APPs 3076-3078, and OS 3080 can include an API 3082, applications 3084, and kernel 1025. As illustrated, kernel 1025 can include a virtual machine monitor (VMM) or hypervisor 3088 an API 3086, and a file system (FS) 3089. In one or more embodiments, VMM 3088 and/or FS 3089 can be located outside kernel 1025 or outside OS 3080.

In one or more embodiments, VMM 3088 can provide resource management and/or scheduling for virtual machines 1030-1032. For example, two or more of virtual machines 1030-1032 can be executed concurrently. In one or more embodiments, concurrently can mean simultaneously. For example, processor 3010 may include multiple cores, and each of multiple virtual machines 1030-1032 can execute simultaneously on each of the multiple cores of processor 3010. In one or more embodiments, concurrently can mean apparently simultaneously according to some metric. For example, processor 3010 may include a single core, and each of multiple virtual machines 1030-1032 can be scheduled and/or prioritized to execute on the single core of processor 3010 by a scheduling and/or prioritizing process such that two or more of virtual machines 1030-1032 appear to execute simultaneously to a human. In one or more embodiments, one or more applications 1040-1042, virtual machines 1030-1032, and OS 3080 can include instructions executable by processor 3010 to implement one or more methods and/or one or more systems described herein.

In one or more embodiments, two or more of segments 4000-4002 can be executed on respective two or more separate processors of MD 2010 or can be executed on respective two or more cores of processor 3010. For example, two or more of a personal segment, a business segment, and a consulting segment can execute on respective two or more separate processors of MD 2010 or can execute on respective two or more cores of a processor of MD 2010. In one or more embodiments, when two or more of segments 4000-4002 are executed on respective two or more separate processors or respective two or more cores of processor 3010, two or more of applications 1040-1042 can be executed on respective two or more separate processors of MD 2010 or on respective two or more cores of processor 3010, and kernel 1025 can provide a scheduling and/or prioritizing process such that 110 devices 1020 can be shared between or among two or more of applications 1040-1042 executing on respective two or more separate processors of MD 2010 or respective two or more cores of processor 3010.

In one or more embodiments, user output interface 3040 can be used to convey information (e.g., text, graphic, video, haptic, audio, etc.) to a user of MD 2010. For example, MD 2010 may include a display (e.g., a display screen) that can be used to convey text, graphic, image, and/or video information to a user of MD 2010. In one or more embodiments, MD 2010 can include a sound output device 3042 coupled to user output interface 3040. In one or more embodiments, sound output device 3042 can include a device and/or circuitry that can produce one or more sounds.

In one or more embodiments, user input interface can be used to receive user input from a user of MD 2010. In one example, MD 2010 may include a keyboard that can be used to receive user input from a user of MD 2010. In another example, MD 2010 may include one or more sensors that can be used to receive user input from a user of MD 2010. In one instance, one or more sensors can include resistive sensors that can be used to determine one or more positions on a display screen. In another instance, one or more sensors can include capacitive sensors that can be used to determine one or more positions on a display screen. In one or more embodiments, user output interface 3040 and user input interface 3050 can be used to implement a keyboard. For example, user output interface 3040 can be used to present an image of a keyboard, and user input interface 3050 can receive a position of user input on the image of the keyboard to determine a received key of the keyboard. In one or more embodiments, buttons 2050-2056 can be coupled to input interface 3050. In one or more embodiments, touch screen 2030 can be coupled to output interface 3040 and input interface 3050.

In one or more embodiments, network interface 3030 can include a transceiver that is operable to communicate information with the telecommunications network. In one or more embodiments, network interface 3030 can include a subscriber identity module (SIM) 3060. In one or more embodiments, SIM 3060 can securely store an international mobile subscriber identity (IMSI) which can include a unique number and/or identity associated with a global system for mobile communications (GSM) network and/or a universal mobile telecommunications system (UMTS) network. In one example, the unique number and/or identity can be used to determine information corresponding to MD 2010 from a home location register (HLR) and/or from a visitor location register (VLR). In one or more embodiments, a MSISDN (mobile subscriber ISDN (integrated services digital network) number, mobile station international ISDN number(s), or mobile international ISDN number) can be a number that can uniquely identify a subscription in a GSM mobile network and/or a UMTS (universal mobile telecommunications system) mobile network. For example, the MSISDN can include a telephone number corresponding to SIM 3060. In one instance, the MSISDN can include a country code, a national destination code, and a subscriber number. In another instance, the MSISDN can include a country code, a number planning area, and a subscriber number.

In one or more embodiments, SIM 3060 can be embodied in a removable card (e.g., a SIM card) that can be removed from a first MD associated with a first subscriber account and placed in a second MD, so that the second MD can be associated with the first subscriber account. For example, SIM 3060 embodied as a SIM card can be associated with a first subscriber account and used in MD 2010, thereby associating MD 2010 with the first subscriber account; SIM 3060 can be removed from MD 2010, thereby disassociating MD 2010 with the first subscriber account; and SIM 3060 can be placed in MD 2010, thereby associating MD 2010 with the first subscriber account.

In one or more embodiments, network interface 3030 can be used to couple MD 2010 to a telecommunications network, and MD 2010 can use network interface 3030 to communicate information (e.g., data, voice data, etc.) with the telecommunications network. For instance, the telecommunications network can be and/or implement a wireless telecommunications network that can support one or more wireless telecommunications network protocols such as one or more of General Packet Radio Service (GPRS), enhanced data rates for GSM evolution (EDGE), long term evolution (LTE), CDMA (code division multiple access), TDMA (time division multiple access), and/or FDMA (frequency division multiple access), among others. In one or more embodiments, the telecommunications network can be coupled to and/or include a telephony network that can include a wireless cellular telecommunications network and/or a wireless satellite telecommunications network. In one or more embodiments, the telephony network can communicate information such as voice and/or data. In one or more embodiments, the telecommunications network can implement and/or provide access and/or services of one or more other networks (e.g., a wide are network, an Internet, etc.).

In one or more embodiments, network interface 3031 can be used to communicate with an access point (AP). In one example, network interface 3031 can be configured and used to communicate with a wired AP, and in another example, network interface 3031 can be configured and used to communicate with a wireless AP. In one or more embodiments, network interface 3031 can include a transceiver that is operable to communicate information with an AP.

In one or more embodiments, an AP can be coupled to a packet network, and the packet network can include a wired network, a wireless network or a combination of wired and wireless networks. The packet network can include and/or be coupled to various types of communications networks, such as a public switched telephone network (PSTN), an Internet, a wide area network (WAN) (e.g., a private WAN, a corporate WAN, a public WAN, etc.), and/or a local area network (LAN), among others. In one or more embodiments, the AP can be coupled to a PSTN, e.g., Ethernet cable and DSL; a cable (television) based network; a satellite-based system; and/or a fiber based network; among others. In one or more embodiments, the packet network can include one or more wireless networks, e.g., based on IEEE 802.15, IEEE 802.11 and/or IEEE 802.16, among others. In one instance, the AP can be coupled to the packet network in a wireless fashion. In another instance, the AP can be coupled to the packet network in a wired fashion. The packet network can include one or more DSL (digital subscriber line) and/or cable (e.g., cable television) networks and/or infrastructures. For example, the packet network can include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In one or more embodiments, the packet network may form part of the Internet, or may couple to other networks, e.g., other local or wide area networks such as the Internet.

In one or more embodiments, MD 2010 can include a position device 3090 coupled to processor 3010. In one example, position device 3090 can include a global positioning system (GPS) receiver. In another example, position device 3090 can include a terrestrial radio navigation system receiver such as LORAN (LOng RAngeNavigation). In one or more embodiments, position device 3090 can provide one or more services such as one or more of positioning, navigation, and timing to processor 3010. For example, a positioning service can provide one or more of latitude information, longitude information, altitude information, and accuracy information (e.g., a radius of uncertainty for a geographic location or position).

In one or more embodiments, position device 3090 can provide heading information. For example, position device 3090 can include a compass and/or implement a compass to provide heading information. In one or more embodiments, position device 3090 can provide device position information such as tilt and/or angle information. For example, position device 3090 can include one or more of an accelerometer and an electronic gyroscope. In one or more embodiments, the compass can be electronically gimbaled using one or more of an accelerometer and an electronic gyroscope.

Figure 4:
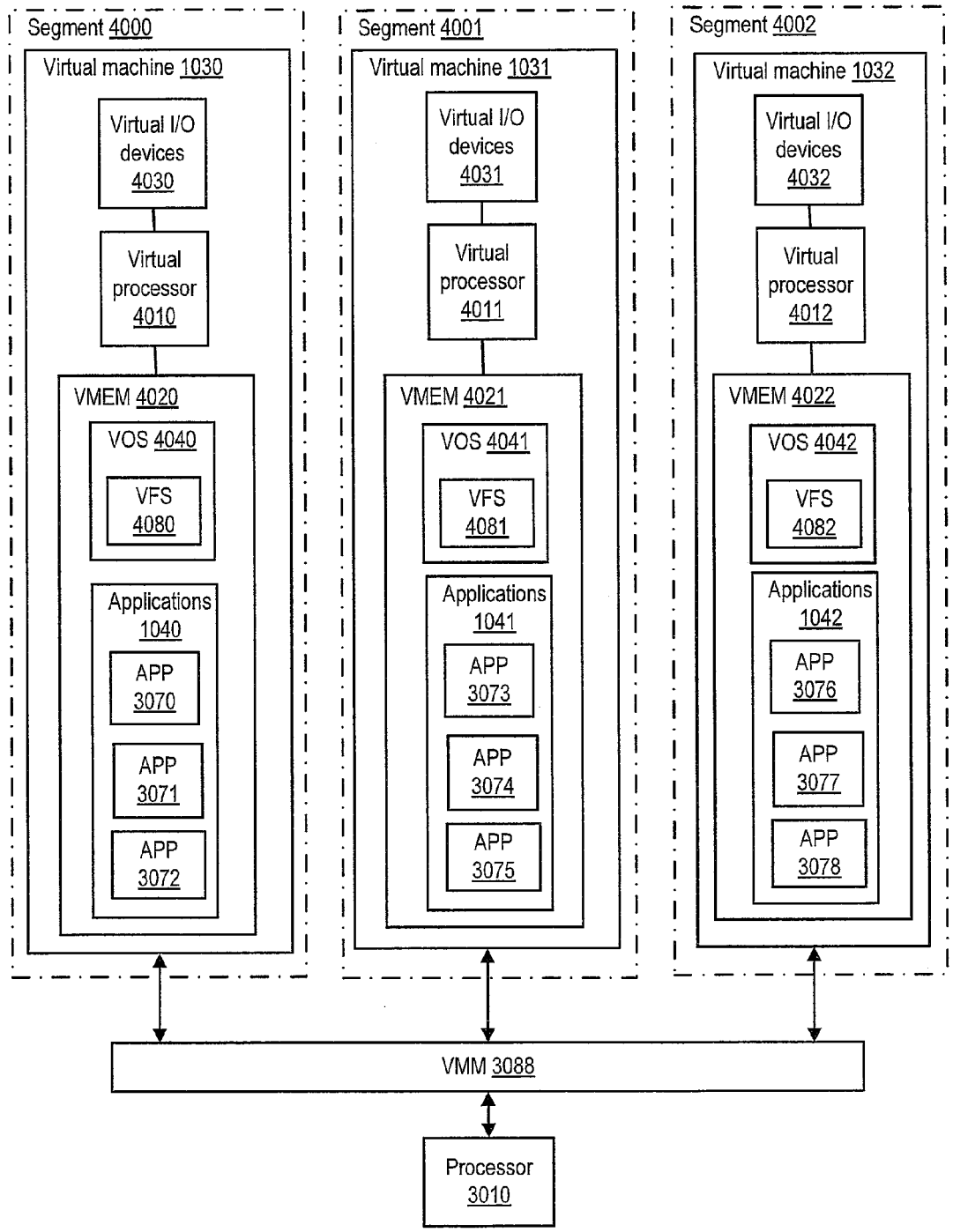
FIG. 4 provides a block diagram of virtual machines, according to one or more embodiments.

Turning now to FIG. 4, a block diagram of virtual machines is illustrated, according to one or more embodiments. As illustrated, segments 4000-4002 can include virtual machines 1030-1032, respectively. In one or more embodiments, segments 4000-4002 can be associated with respective icons 2040-2042.

As shown, virtual machine 1030 that can include a virtual processor 4010 which can implement one or more virtual cores, and each virtual core of virtual processor 4010 can implement an ISA. In one or more embodiments, each of multiple virtual cores of virtual processor 4010 can execute different instructions from the ISA simultaneously. In one or more embodiments, the ISA implemented by virtual processor 4010 can differ from the ISA of hardware processor 3010. For example, the ISA implemented by virtual processor 4010 may include instructions from an ARM ISA (available from ARM Holding, Inc.) while the ISA of hardware processor 3010 may include instructions from a PPC (PowerPC) ISA (available from International Business Machine, Inc.). In one or more embodiments, the ISA implemented by virtual processor 4010 may not differ from the ISA of hardware processor 3010. In one or more embodiments, virtual processor 4010 may implement a proper subset of an ISA of hardware processor 3010. In one or more embodiments, virtual processor 4010 may implement a superset of an ISA of hardware processor 3010.

As shown, virtual processor 4010 can be coupled to virtual I/O devices 4030. In one or more embodiments, virtual I/O devices 4030 can implement virtual instances of one or more of network interfaces 3030 and 3031, user output interface 3040, user input interface 3050, and position device 3090, among others. As illustrated, a virtual memory (VMEM) 4020 can include a virtual OS (VOS) 4040 and applications 1040. In one or more embodiments, VOS 4040 and applications 1040 can be executed by virtual processor 4010, and virtual file system (VFS) 4080 can be utilized by VOS 4040 to store and/or retrieve one or more of files (e.g., applications, data files, etc.) and directories (e.g., folders).

As illustrated, virtual machine 1031 can include virtual I/O devices 4031 and a VMEM 4021 coupled to a virtual processor 4011, and virtual machine 1032 can include virtual I/O devices 4032 and a VMEM 4022 coupled to a virtual processor 4012. VMEM 4021 can include a VOS 4041 and applications 1041, and VMEM 4022 can include VOS 4042 and applications 1042. In one or more embodiments, VFSs 4081 and 4082 can be utilized by respective VOSs 4041 and 4042 to store and/or retrieve respective one or more of files (e.g., applications, data files, etc.) and directories (e.g., folders).

In one or more embodiments, virtual machines 1031 and 1032 can be described with reference to virtual machine 1030. For example, virtual machines 1031 and 1032 can include structures and/or functionality described with reference to virtual machine 1030. In one or more embodiments, an ISA implemented by virtual processor 4011 can differ from the ISA implemented by virtual processor 4010. For example, the ISA implemented by virtual processor 4011 may include instructions from a MIPS ISA while the ISA implemented by virtual processor 4010 may include instructions from an ARM ISA. In one or more embodiments, the ISA implemented by virtual processor 4011 may not differ from the ISA implemented by virtual processor 4010. In one or more embodiments, virtual processor 4010 may implement a proper subset of an ISA of virtual processor 4011. In one or more embodiments, virtual processor 4010 may implement a superset of an ISA of virtual processor 4011.

In one or more embodiments, VMM 3088 is executed on actual hardware and exports processor, memory, and/or I/O interfaces to virtual machines 1030-1032. In one example, VOS 4040 and/or applications 1040 can function as if executed on actual hardware rather than virtual hardware. In one or more embodiments, VMM 3088 can provide scheduling, prioritization, and/or resource management of virtual machines 1030-1032. In one example, two or more of virtual machines 1030-1032 can operate concurrently using VMM 3088 to provide scheduling, prioritization, and/or resource management of elements of MD 2010. In another example, two or more of virtual machines 1030-1032 can operate one at a time. For instance, virtual machine 1030 can operate while virtual machines 1031 and 1032 do not operate. For example, VMM 3088 can place virtual machines 1031 and 1032 in a sleep or hibernation state.

In one or more embodiments, operating virtual machines 1030-1032 in a one at a time fashion can conserve power consumed by MD 2010. For example, MD 2010 can be powered by a limited power source. In one or more instances, the limited power source can include one or more of a battery, a solar cell, a fuel cell, and a capacitor, among others. In one or more embodiments, MD 2010 can include the limited power source. In one or more embodiments, using a segment such as business applications (e.g., applications 1041) may annul or vacate a necessity or desire to use a segment such as consumer (e.g., personal) applications (e.g., applications 1040).

In one or more embodiments, VMM 3088 can isolate a first segment from a second segment. For example, VMM 3088 can isolate segment 4000 from segment 4001. For instance, if an application (e.g., APP 3072) from segment 4000 is problematic (e.g., crashes, includes malicious software, etc.), VMM 3088 can isolate segment 4001 from segment 4000 and its problematic application.

In one or more embodiments, an architecture (e.g., an instruction set architecture) can include non-privileged instructions and privileged instructions. For example, a processor can include two or more that can correspond to two or more privilege levels. For instance, a processor can include a supervisory mode and a user mode. In one or more embodiments, computing resources (e.g., memory, pages of memory I/O devices, etc.) can be associated with privileged instructions. For example, when a VOS (or application) attempts to execute a privileged instruction to access a computing resource, VMM 3088 can trap (e.g., intercept) the privileged instruction.

In one or more embodiments, VMM 3088 can service the privileged instruction by trapping the privileged instruction from the VOS. In one example, VMM 3088 can execute two or more instructions in servicing the trapped privileged instruction from the VOS. For instance, the two or more instructions executed by VMM 3088 can perform one or more of checking access bounds of one or more of a memory access and an I/O device access, checking for an invalid pointer (e.g., a dereferenced pointer), checking for controlling an I/O device access, and checking for a stack overflow. If VMM 3088 determines that a fault would occur from the one or more checks, then VMM 3088 may not service the privileged instruction from the VOS. In one or more embodiments, VMM 3088 may service the instruction in the context of the virtual machine executing the VOS by implementing the privileged instruction by executing two or more instructions that would provide the privileged instruction to execute on the virtual machine. In this fashion, VMM 3088 can isolate a first virtual machine from a second virtual machine. For example, VMM 3088 can isolate virtual machine 1030 from virtual machine 1031. By isolating virtual machine 1030 from virtual machine 1031, segment 4000 can be isolated from segment 4001. In one or more embodiments, VMM 3088 can service the privileged instruction in the context of the first virtual machine, the first virtual machine can crash, and the crash of the first virtual machine may not adversely affect the second virtual machine by VMM 3088 isolating the first and second virtual machines.

Figure 5:
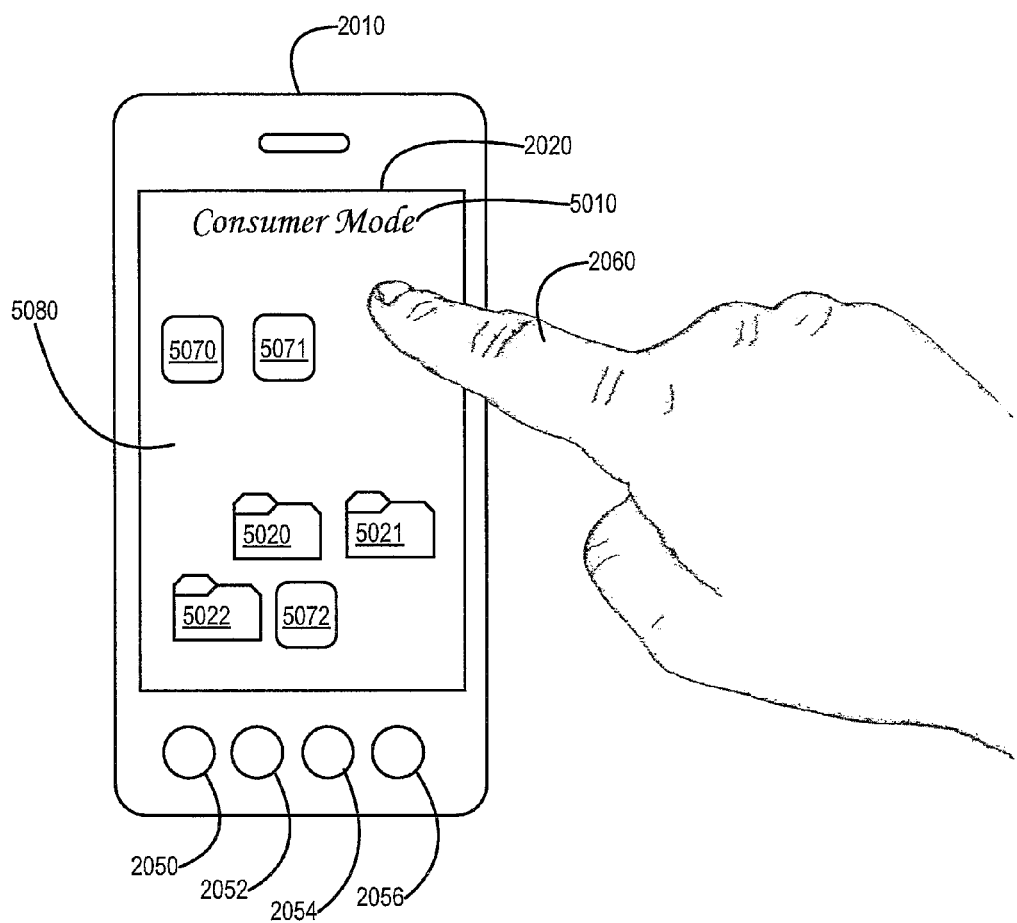
FIG. 5 provides a diagram of a mobile device executing a consumer or personal segment, icons, and a portion of a user of the mobile device, according to one or more embodiments.

Turning now to FIG. 5, a diagram of a mobile device executing a consumer or personal segment, icons, and a portion of a user of the mobile device are illustrated, according to one or more embodiments. As shown, a screen 5080 can be displayed by touch screen 2020 and can display message 5010 and icons 5020-5022 and 5070-5072. In one example, message 5010 can convey a mode of operation of MD 2010. For instance, message 5010 can convey a consumer or personal mode of operation of MD 2010. In one or more embodiments, icons 5070-5072 can correspond with APPs 3070-3072, respectively. In one or more embodiments, icons 5020-5021 can correspond with folders or directories of VFS 4080.

Figure 6:
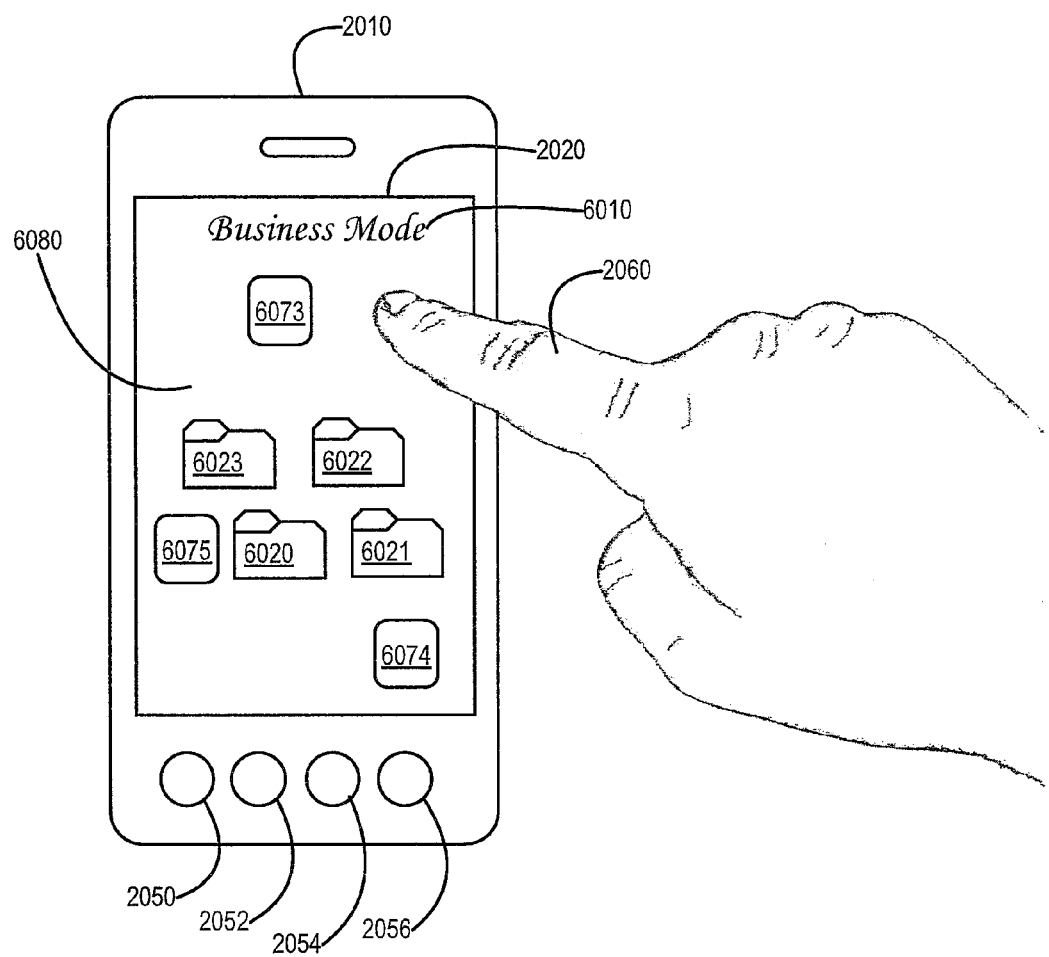
FIG. 6 provides a diagram of a mobile device executing a business segment, icons, and a portion of a user of the mobile device, according to one or more embodiments.

Turning now to FIG. 6, a diagram of a mobile device executing a business segment, icons, and a portion of a user of the mobile device are illustrated, according to one or more embodiments. As shown, a screen 6080 can be displayed by touch screen 2020 and can display message 6010 and icons 6073-6075 and 6020-6023. In one example, message 6010 can convey a mode of operation of MD 2010. For instance, message 6010 can convey a business mode of operation of MD 2010. In one or more embodiments, icons 6073-6075 can correspond with APPs 3073-3075, respectively. In one or more embodiments, icons 6020-6023 can correspond with folders or directories of VFS 4081.

Figure 7:
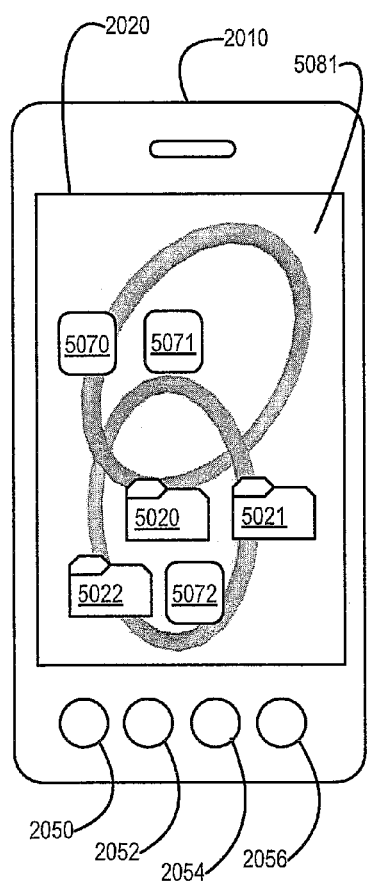
FIG. 7 provides a diagram of a mobile device executing a consumer or personal segment, icons, and a background indicating the personal or consumer segment of the mobile device, according to one or more embodiments.

Turning now to FIG. 7, a diagram of a mobile device executing a consumer or personal segment, icons, and a background indicating the personal or consumer segment of the mobile device are illustrated, according to one or more embodiments. As shown, a screen 5081 can be displayed by touch screen 2020 and can display a background or "skin" that can indicate a consumer or personal segment or mode of MD 2010.

Figure 8:
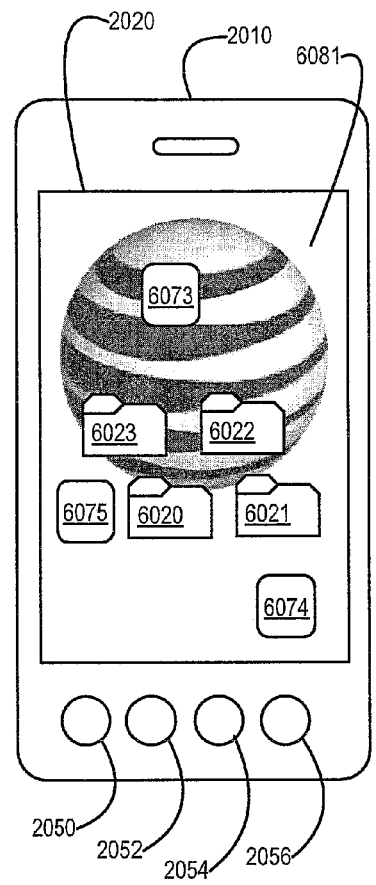
FIG. 8 provides a diagram of a mobile device executing a business segment, icons, and a background indicating the business segment of the mobile device, according to one or more embodiments.

Turning now to FIG. 8, a diagram of a mobile device executing a business segment, icons, and a background indicating the business segment of the mobile device are illustrated, according to one or more embodiments. As shown, a screen 6081 can be displayed by touch screen 2020 and can display a background or "skin" that can indicate a consumer or personal segment or mode of MD 2010.

Figure 9:
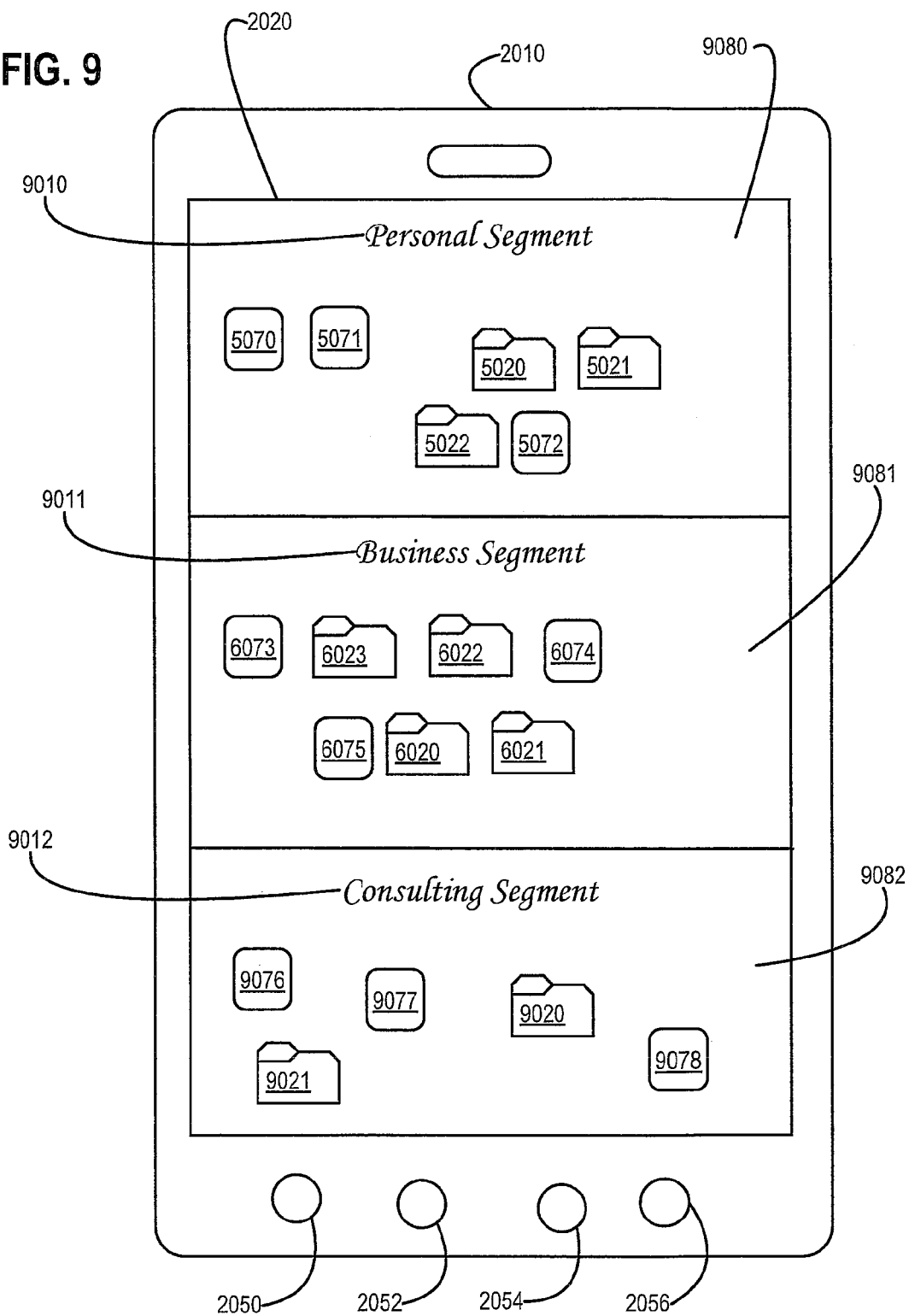
FIG. 9 provides a diagram of a mobile device displaying icons and text for multiple segments in multiple respective portions of a display, according to one or more embodiments.

Turning now to FIG. 9, a diagram of a mobile device displaying icons and text for multiple segments in multiple respective portions of a display is illustrated, according to one or more embodiments. As shown, touch screen 2020 can display multiple screen portions 9080-9082 that correspond to respective segments 4000-4002. In one or more embodiments, screen portion 9080 can display icons 5020-5022 and 5070-5072 and can display a message 9010 to convey and/or indicate a personal/consumer segment and/or personal/consumer mode of operation of MD 2010; screen portion 9081 can display icons 6020-6023 and 6073-6075 and can display a message 9011 to convey and/or indicate a business segment and/or business mode of operation of MD 2010; and screen portion 9082 can display icons 9076-9078, 9020 and 9021 and can display a message 9012 to convey and/or indicate a consulting segment and/or consulting mode of operation of MD 2010. In one or more embodiments, icons 9076-9078 can correspond with APPs 3076-3078, respectively. In one or more embodiments, icons 9020 and 9021 can correspond with folders or directories of VFS 4082.

In one or more embodiments, two or more of segments 4000-4002 can be executed concurrently. In one or more embodiments, a user of MD 2010 can select an icon from a screen portion of screen portions 9080-9082, and in response, a segment corresponding to the screen portion that includes the selected icon can be executed.

Figure 10:
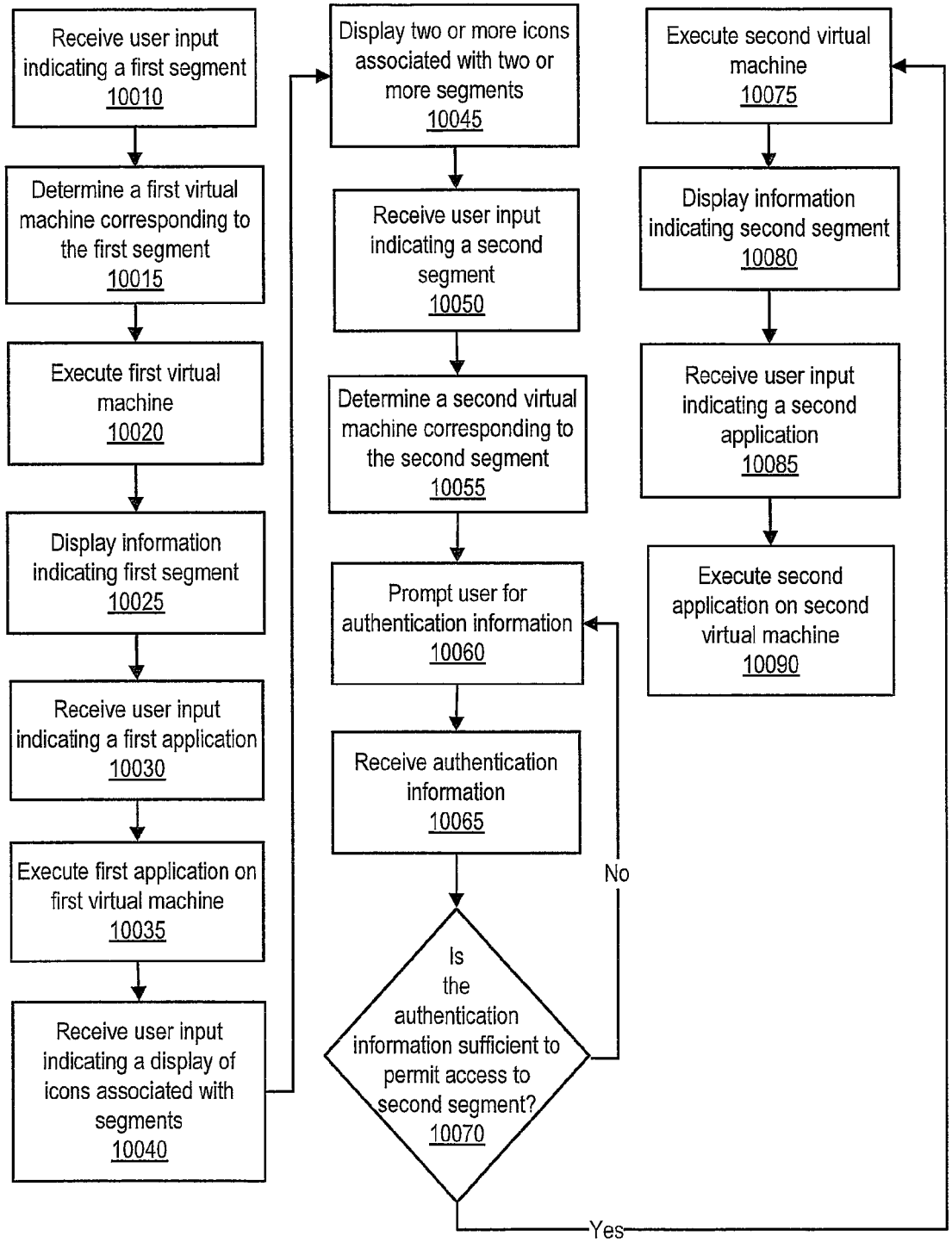
FIG. 10 illustrates a method, according to one or more embodiments.

Turning now to FIG. 10, a method is illustrated, according to one or more embodiments. At 10010, user input indicating a first segment can be received. For example, the user input can be received from a selection of an icon of icons 2040-2042 that can indicate a first segment of a consumer or personal segment, a business segment, and a consulting segment, respectively. In one or more embodiments, each segment can be associated with a virtual machine of virtual machines 1030-1032. At 10015, a first virtual machine corresponding to the first segment can be determined. For example, virtual machine 1030 can be determined using the first segment. At 10020, the determined virtual machine can be executed. For example, virtual machine 1030 can be determined and executed. At 10025, information indicating the first segment can be displayed. In one example, a string indicating the first segment can be displayed. In another example, a background or "skin" indicating the first segment can be displayed.

At 10030, user input indicating a first application can be received. For example, the user input can be from a selection of an icon of icons. For instance, user input indicating an icon of icons 5070-5072 can be received. At 10035, the first application corresponding to the selected icon can be executed. For example, icon 5071 can be selected by the user input, and application 3071 can be executed on virtual machine 1030.

At 10040, user input indicating a display of one or more segments can be received. For example, user input indicating a display of one or more segments can be received by the user actuating a button from buttons 2050-2056. At 10045, one or more icons associated with one or more segments can be displayed. For example, one or more of icons 2040-2042 can be displayed. At 10050, user input indicating a second segment can be received. For example, the user input can be received from a selection of an icon from one or more of icons 2040-2042 that can indicate a second segment of a consumer or personal segment, a business segment, and a consulting segment, respectively. At 10055, a virtual machine corresponding to selected segment can be determined. For example, virtual machine 1031 can be determined using the selected segment.

At 10060, the user can be prompted to participate in an authentication process. In one or more embodiments, a virtual machine can be executed after an authentication process has successfully authenticated a user of MD 2010. For example, virtual machine 1031 can be associated with a business segment, and virtual machine 1031 may include and/or have access to sensitive (e.g., confidential, secret, privileged, etc.) information. In one or more embodiments, information stored in a memory of a virtual machine can be encrypted. For example, some or all information stored in VMEM 4021 can be encrypted. For instance, encrypted information can be available after an authentication process has successfully authenticated a user of MD 2010. At 10065, authentication information can be received. In one or more embodiments, the authentication information can be usable to authenticate a specific user. In one or more embodiments, the authentication information can include one or more of a user name, a password, and biometric information (e.g., a fingerprint, facial information, retinal information, etc.) of a user of MD 2010. At 10070, it can be determined whether or not the authentication information suffices to permit the second segment to be accessed. For example, it can be determined whether or not the authentication information suffices to permit virtual machine 1031 to be executed.

If the authentication information does not suffice to permit the second segment to be accessed, the method can proceed to 10060. If the authentication information does suffice to permit the second segment to be accessed, the second virtual machine can be executed at 10075. For example, virtual machine 1031 can be executed. At 10080, information indicating the second segment can be displayed. In one example, a string indicating the second segment can be displayed. In another example, a background or "skin" indicating the second segment can be displayed.

At 10085, user input indicating a second application can be received. For example, the user input can be from a selection of an icon of icons. For instance, user input indicating an icon of icons 6073-6075 can be received. At 10090, the second application corresponding to the selected icon can be executed. For example, icon 6074 can be selected by the user input, and application 3074 can be executed on virtual machine 1031. In one or more embodiments, virtual machines 1030 and 1031 can be executed concurrently. In one or more embodiments, virtual machines 1030 and 1031 can be executed one at a time.

Figure 11:
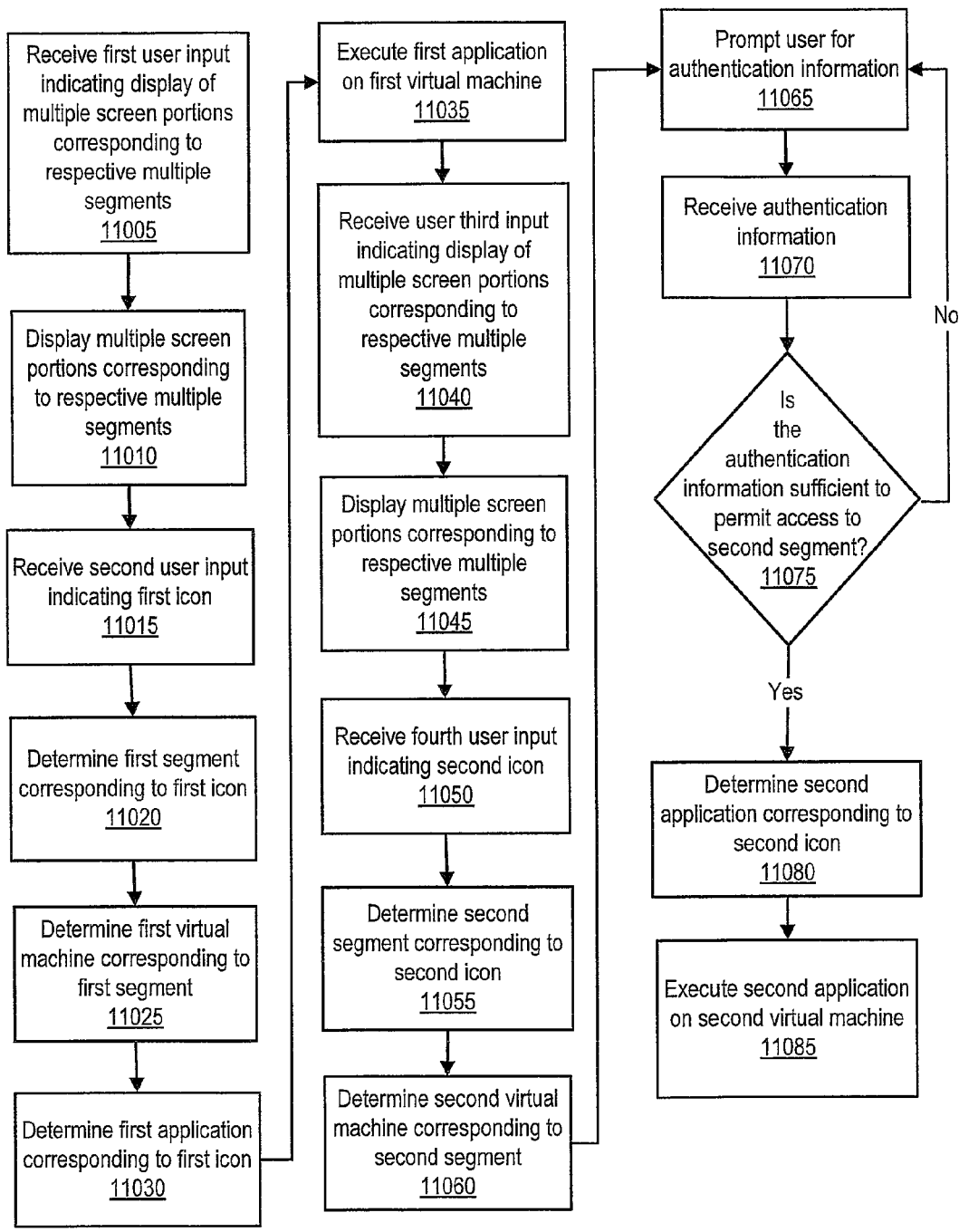
FIG. 11 illustrates a method, according to one or more embodiments.

Turning now to FIG. 11, a method is illustrated, according to one or more embodiments. At 11005, first user input indicating a display of multiple screen portions corresponding to multiple respective segments can be received. For example, a user of MID 2010 may actuate a button from buttons 2050-2056 to indicate a display of multiple screen portions corresponding to multiple respective segments. At 11010, multiple screen portions corresponding to respective segments can be displayed. For example, two or more of screen portions 9080-9081 can be displayed on touch screen 2020. For instance, two or more of screen portions 9080-9081 can correspond respectively to two or more segments 4000-4002.

At 11015, second user input indicating a first icon can be received. For example, icon 5071 can be selected by the second user input. At 11020, a first segment corresponding to the first icon can be determined. For example, segment 4000 can be determined when icon 5071 is selected. At 11025, a first virtual machine corresponding to the first segment can be determined. For example, virtual machine 1030 can be determined. At 11030, a first application corresponding to the first icon can be determined. For example, APP 3071 can be determined when icon 5071 is selected. At 11035, the first application can be executed on the first virtual machine. For example, APP 3071 can be executed on virtual machine 1030.

At 11040, third user input indicating a display of multiple screen portions corresponding to multiple respective segments can be received. For example, a user of MD 2010 may actuate a button from buttons 2050-2056 to indicate a display of multiple screen portions corresponding to multiple respective segments. At 11045, multiple screen portions corresponding to respective segments can be displayed. For example, two or more of screen portions 9080-9081 can be displayed on touch screen 2020. For instance, two or more of screen portions 9080-9081 can correspond respectively to two or more segments 4000-4002. At 11050, fourth user input indicating a second icon can be received. For example, icon 6074 can be selected by the fourth user input. At 11055, a second segment corresponding to the second icon can be determined. For example, segment 4001 can be determined when icon 6074 is selected. At 11060, a second virtual machine corresponding to the first segment can be determined. For example, virtual machine 1031 can be determined.

At 11065, the user can be prompted to participate in an authentication process. In one or more embodiments, a virtual machine can be executed after an authentication process has successfully authenticated a user of MD 2010. For example, virtual machine 1031 can be associated with a business segment, and virtual machine 1031 may include and/or have access to sensitive (e.g., confidential, secret, privileged, etc.) information. In one or more embodiments, information stored in a memory of a virtual machine can be encrypted. For example, some or all information stored in VMEM 4021 can be encrypted. For instance, encrypted information can be available after an authentication process has successfully authenticated a user of MD 2010. At 11070, authentication information can be received. In one or more embodiments, the authentication information can be usable to authenticate a specific user. In one or more embodiments, the authentication information can include one or more of a user name, a password, and biometric information (e.g., a fingerprint, facial information, retinal information, etc.) of a user of MD 2010. At 11075, it can be determined whether or not the authentication information suffices to permit the second segment to be accessed. For example, it can be determined whether or not the authentication information suffices to permit virtual machine 1031 to be executed.

If the authentication information does not suffice to permit the second segment to be accessed, the method can proceed to 11065. If the authentication information does suffice to permit the second segment to be accessed, a second application corresponding to the second icon can be determined at 11080. For example, APP 3074 can be determined when icon 6074 is selected. At 11085, the second application can be executed on the second virtual machine. For example, APP 3074 can be executed on virtual machine 1031.

In one or more embodiments, the term "memory" can mean a "memory medium" and/or "computer readable medium" which is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., and/or a non-volatile memory such as a magnetic media, e.g., a hard drive, and/or optical storage. The memory medium can include other types of memory as well, or combinations thereof. In one or more embodiments, the memory medium can be and/or include an article of manufacture and/or a software product. In addition, the memory medium can be located in a first computer in which the programs are executed, or can be located in a second different computer and/or hardware memory device that connects to the first computer over a network. In one or more embodiments, the second computer provides the program instructions to the first computer for execution. The memory medium can also be a distributed memory medium, e.g., for security reasons, where a portion of the data is stored on one memory medium and the remaining portion of the data can be stored on a different memory medium. Also, the memory medium can include one of the networks to which the current network is coupled, e.g., a SAN (Storage Area Network).

In one or more embodiments, each of the systems described herein may take various forms, including a personal computer system, server computer system, workstation, network appliance, Internet appliance, wearable computing device, personal digital assistant (PDA), laptop, mobile telephone, mobile multimedia device, embedded computer system, television system, and/or other device. In general, the terms "computing device", "computer", and/or "computer system" can be broadly defined to encompass any device having a processor which executes instructions from a memory medium.

The memory medium in one or more systems thus can store a software program and/or data for performing and/or enabling automatic sound level control. A CPU or processing unit in one or more systems executing code and data from a memory medium includes a means for executing one or more software program according to the methods and/or flowcharts described herein.

It is noted that, in one or more embodiments, one or more of the method elements described herein and/or one or more portions of an implementation of a method element may be performed in varying orders, can be performed concurrently with one or more of the other method elements and/or one or more portions of an implementation of a method element, or can be omitted. Additional method elements can be performed as desired. In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is also noted that, in one or more embodiments, one or more of the system elements described herein may be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:
1. A method, comprising:
 displaying, by a handheld device, a plurality of icons associated with a plurality of segments, wherein each segment is associated with a virtual machine of a plurality of virtual machines;

receiving, by the handheld device, first user input indicating a first icon of the plurality of icons, wherein the first icon is associated with a first segment of the plurality of segments;
executing, by the handheld device, a first virtual machine of the plurality of virtual machines associated with the first segment;
executing a first application on the first virtual machine;
receiving second user input indicating a second icon of the plurality of icons, the second icon associated with a second segment of the plurality of segments;
in response to the second user input indicating the second icon associated with the second segment, selectively prompting for authentication information based on a second virtual machine of the plurality of virtual machines having access to sensitive information, wherein the second virtual machine is associated with the second segment;
receiving authentication information;
determining whether a user is authenticated based on the authentication information;
executing, by the handheld device, the second virtual machine in response to determining that the user is authenticated;
executing a second application on the second virtual machine;
determining whether execution of an instruction associated with the first virtual machine would result in a fault; and
in response to determining that execution of the instruction would result in the fault, preventing execution of the instruction and allowing the first virtual machine to fail without adversely affecting the second virtual machine.

2. The method of claim 1, further comprising:
executing a first plurality of applications on a first processor core of a plurality of processor cores, wherein the first plurality of applications includes the first application;
executing a second plurality of applications on a second processor core of the plurality of processor cores, wherein the second plurality of applications includes the second application; and
prioritizing access of the first plurality of applications and the second plurality of applications to an input device, an output device, or a combination thereof.

3. The method of claim 1,
wherein the first virtual machine includes a first virtual processor that implements a first instruction set architecture,
wherein the second virtual machine includes a second virtual processor that implements a second instruction set architecture, and
wherein the first instruction set architecture is different than the second instruction set architecture.

4. The method of claim 1, further comprising:
executing a virtual machine manager that performs at least one of scheduling and prioritizing execution of the first virtual machine and execution of the second virtual machine.

5. A mobile device, comprising:
a processor;
a display coupled to the processor; and
a computer-readable storage device storing instructions that, when executed by the processor, cause the processor to perform operations including:
displaying, on the display, a plurality of icons associated with a plurality of segments, wherein each segment is associated with a virtual machine of a plurality of virtual machines;
receiving first user input indicating a first icon of the plurality of icons, wherein the first icon is associated with a first segment of the plurality of segments;
executing a first virtual machine of the plurality of virtual machines associated with the first segment;
executing a first application on the first virtual machine;
receiving second user input indicating a second icon of the plurality of icons, wherein the second icon is associated with a second segment of the plurality of segments;
in response to the second user input indicating the second icon associated with the second segment, selectively prompting for authentication information based on a second virtual machine of the plurality of virtual machines having access to sensitive information, wherein the second virtual machine is associated with the second segment;
receiving authentication information;
determining whether a user is authenticated based on the authentication information;
executing the second virtual machine in response to determining that the user is authenticated;
executing a second application on the second virtual machine;
determining whether execution of an instruction associated with the first virtual machine would result in a fault; and
in response to determining that execution of the instruction would result in the fault, preventing execution of the instruction and allowing the first virtual machine to fail without adversely affecting the second virtual machine.

6. The mobile device of claim 5, wherein the operations further include:
displaying, on the display, a plurality of screen portions, wherein a single screen portion of the plurality of screen portions corresponds to a particular segment of the plurality of segments, wherein a first screen portion of the plurality of screen portions includes a first plurality of icons of the plurality of icons, wherein each icon of the first plurality of icons corresponds to a particular application of a plurality of applications, wherein the plurality of applications includes the first application, wherein the first plurality of icons includes the first icon, wherein the first icon corresponds to the first application, and
wherein executing the first virtual machine and executing the first application on the first virtual machine are performed in response to receiving the first user input.

7. The mobile handheld device of claim 5,
wherein the processor includes a plurality of cores,
wherein executing the first virtual machine is performed by a first core of the plurality of cores, and
wherein executing the second virtual machine is performed by a second core of the plurality of cores.

8. The mobile device of claim 5,
wherein the first virtual machine includes a first virtual processor that implements a first instruction set architecture,
wherein the second virtual machine includes a second virtual processor that implements a second instruction set architecture, and
wherein the first instruction set architecture is different than the second instruction set architecture.

9. The mobile device of claim 5, wherein the operations further include:
   executing a virtual machine manager that performs at least one of scheduling and prioritizing execution of the first virtual machine and execution of the second virtual machine.

10. A computer-readable storage device storing instructions that, when executed by a processor, cause the processor to perform operations comprising:
   displaying, on a display, a plurality of icons associated with a plurality of segments, wherein each segment is associated with a virtual machine of a plurality of virtual machines;
   receiving first user input indicating a first icon of the plurality of icons, wherein the first icon is associated with a first segment of the plurality of segments;
   executing a first virtual machine of the plurality of virtual machines associated with the first segment;
   executing a first application on the first virtual machine;
   receiving second user input indicating a second icon of the plurality of icons, wherein the second icon is associated with a second segment of the plurality of segment;
   in response to the second user input indicating the second icon associated with the second segment, selectively prompting for authentication information based on a second virtual machine of the plurality of virtual machines having access to sensitive information, wherein the second virtual machine is associated with the second segment;
   receiving authentication information;
   determining whether a user is authenticated based on the authentication information;
   executing the second virtual machine in response to determining that the user is authenticated;
   executing a second application on the second virtual machine;
   determining whether execution of an instruction associated with the first virtual machine would result in a fault; and
   in response to determining that execution of the instruction would result in the fault, preventing execution of the instruction and allowing the first virtual machine to fail without adversely affecting the second virtual machine.

11. The computer-readable storage device of claim 10, wherein the operations further comprise:
   executing a first plurality of applications on a first processor core of a plurality of processor cores;
   executing a second plurality of applications on a second processor core of the plurality of processor cores; and
   prioritizing access of the first plurality of applications and the second plurality of applications to an input device, an output device, or a combination thereof.

12. The computer-readable storage device of claim 10,
   wherein the first virtual machine includes a first virtual processor that implements a first instruction set architecture,
   wherein the second virtual machine includes a second virtual processor that implements a second instruction set architecture, and
   wherein the first instruction set architecture is different than the second instruction set architecture.

13. The computer readable storage device of claim 10, wherein determining whether execution of the instruction would result in the fault is based on checking access bounds of a memory access, checking access bounds of an input-output device access, checking for controlling an input device access, checking for controlling an output device access, checking for an invalid pointer, checking for a stack overflow, or a combination thereof.

14. The computer readable storage device of claim 13, wherein the invalid pointer includes a dereferenced pointer.

* * * * *